US00RE40128E

(19) United States
(12) Reissued Patent
Kielb

(10) Patent Number: US RE40,128 E
(45) Date of Reissued Patent: Mar. 4, 2008

(54) STABILIZATION IN A RADAR LEVEL GAUGE

(75) Inventor: John A. Kielb, Eden Prairie, MN (US)

(73) Assignee: Rosemount Inc., Eden Prairie, MN (US)

(21) Appl. No.: 10/680,875

(22) Filed: Oct. 7, 2003

Related U.S. Patent Documents

Reissue of:
(64) Patent No.: 6,300,897
Issued: Oct. 9, 2001
Appl. No.: 09/347,683
Filed: Jul. 2, 1999

(51) Int. Cl.
*G01S 13/08* (2006.01)

(52) U.S. Cl. ..... 342/124; 342/135; 342/82; 342/84; 342/87; 342/85

(58) Field of Classification Search ..... 342/124, 342/135, 195, 82–88
See application file for complete search history.

(56) References Cited

U.S. PATENT DOCUMENTS 4,044,353 A * 8/1977 Levy ..... 342/124
4,737,791 A * 4/1988 Jean et al. ..... 342/124
4,847,623 A * 7/1989 Jean et al. ..... 342/124
5,563,605 A * 10/1996 McEwan ..... 342/202
5,651,286 A * 7/1997 Champion et al. ..... 73/290 V
5,659,321 A * 8/1997 Burger et al. ..... 342/124
5,672,975 A * 9/1997 Kielb et al. ..... 324/644
5,701,006 A * 12/1997 Schaefer ..... 250/227.16
5,851,083 A * 12/1998 Palan ..... 403/337
6,072,427 A * 6/2000 McEwan ..... 342/175
6,087,978 A * 7/2000 Lalla et al. ..... 342/124
6,107,957 A * 8/2000 Cramer et al. ..... 342/124
6,130,637 A * 10/2000 Meszaros et al. ..... 342/124
6,137,438 A * 10/2000 McEwan ..... 342/134
6,300,897 B1 * 10/2001 Kielb ..... 342/124
6,486,826 B1 * 11/2002 Cramer et al. ..... 342/124

FOREIGN PATENT DOCUMENTS

DE 29815069 U * 12/1998
WO WO 9814763 A * 4/1998

OTHER PUBLICATIONS

"Smart Transmitter Using Microwave Pulses to Measure the Level of Liquids and Solids in Process Applications", H. Lang et al OISA, pp. 731–742 (1993).*
Electronics Designer's Handbook, 2nd Edition, Giacoletto, p. 25–10 (1977).*

* cited by examiner

*Primary Examiner*—John B Sotomayor
(74) *Attorney, Agent, or Firm*—Westman, Champlin & Kelly, P.A.

(57) ABSTRACT

A radar gauge adapted to sense fluid level in a tank and including a radar gauge circuit in which radar transmission and level sampling are controlled by a transmit frequency and a sample frequency respectively. A first frequency separation between first and second frequencies is controlled by a control input. The first and second frequencies can be divided to generate the transmit and sample frequencies, separated by a second frequency separation. At least one frequency difference is evaluated and the evaluation used to generate the control input, stabilizing the first frequency difference, and to correct the gauge output.

30 Claims, 8 Drawing Sheets

STABILIZATION IN A RADAR LEVEL GAUGE

Matter enclosed in heavy brackets [ ] appears in the original patent but forms no part of this reissue specification; matter printed in italics indicates the additions made by reissue.

BACKGROUND OF THE INVENTION

Pulsed time-of-flight radar gauges are utilized for the measurement of level in process storage tanks. These gauges are mounted on the top of storage tanks, and transmit a pulse of microwave energy toward the surface of the product being stored in the tank. The gauge then receives energy which is reflected from the surface of the product, and calculates the level of the product based upon the time of flight of the pulse.

A PRIOR ART circuit 110 for creating the transmit and sample clocks is shown in FIG. 2. Circuits of this type are described in U.S. Pat. No. 5,563,605 McEwan. This circuit has the advantage that only one oscillator 112 is required, as the sample clock 114 is generated by continuously increasing phase delay in a variable delay generator 116 controlled by a delay control ramp 118. The phase delay circuit can be designed to be repeatable, therefore, errors due to changes in the difference frequency are reduced using this circuit design. However, this circuit has the disadvantage of having significant phase jitter or instability in the sample clock. This is a result of performance limitations of the high speed comparator required as part of the phase delay generator.

There is a need for a radar gauge circuit that is stabilized without the use of expensive, complex circuitry.

SUMMARY OF THE INVENTION

In the present invention, a controller feeds back a control output to a clock source. The feedback stabilizes a first frequency separation between first and second clock frequencies generated by the clock source. A separation sensing circuit is coupled to the clock source and generates an evaluation output as a function of the first frequency separation. The evaluation output is coupled to the controller for controlling the control output. A radar gauge circuit receives the first or transmit frequency and the second or sample frequency and controls radar transmission and level sampling as a function of the transmit and sampling frequencies. The radar gauge circuit generates a level output that is stabilized and corrected as a function of the frequency separation.

DETAILED DESCRIPTION OF THE EMBODIMENTS

Figure 1:
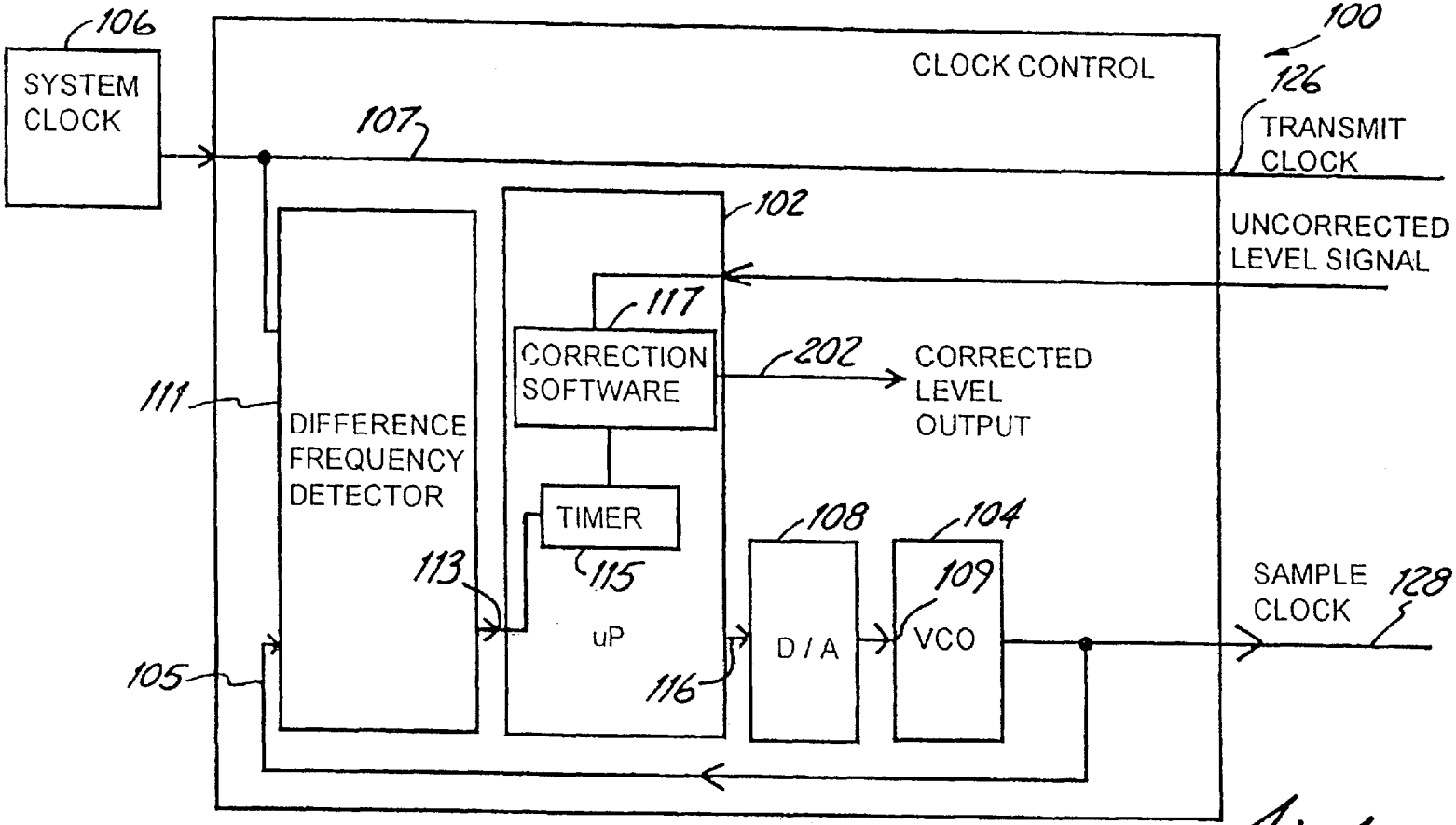
FIG. 1 shows a first block diagram of a radar level gauge.
Figure 2:
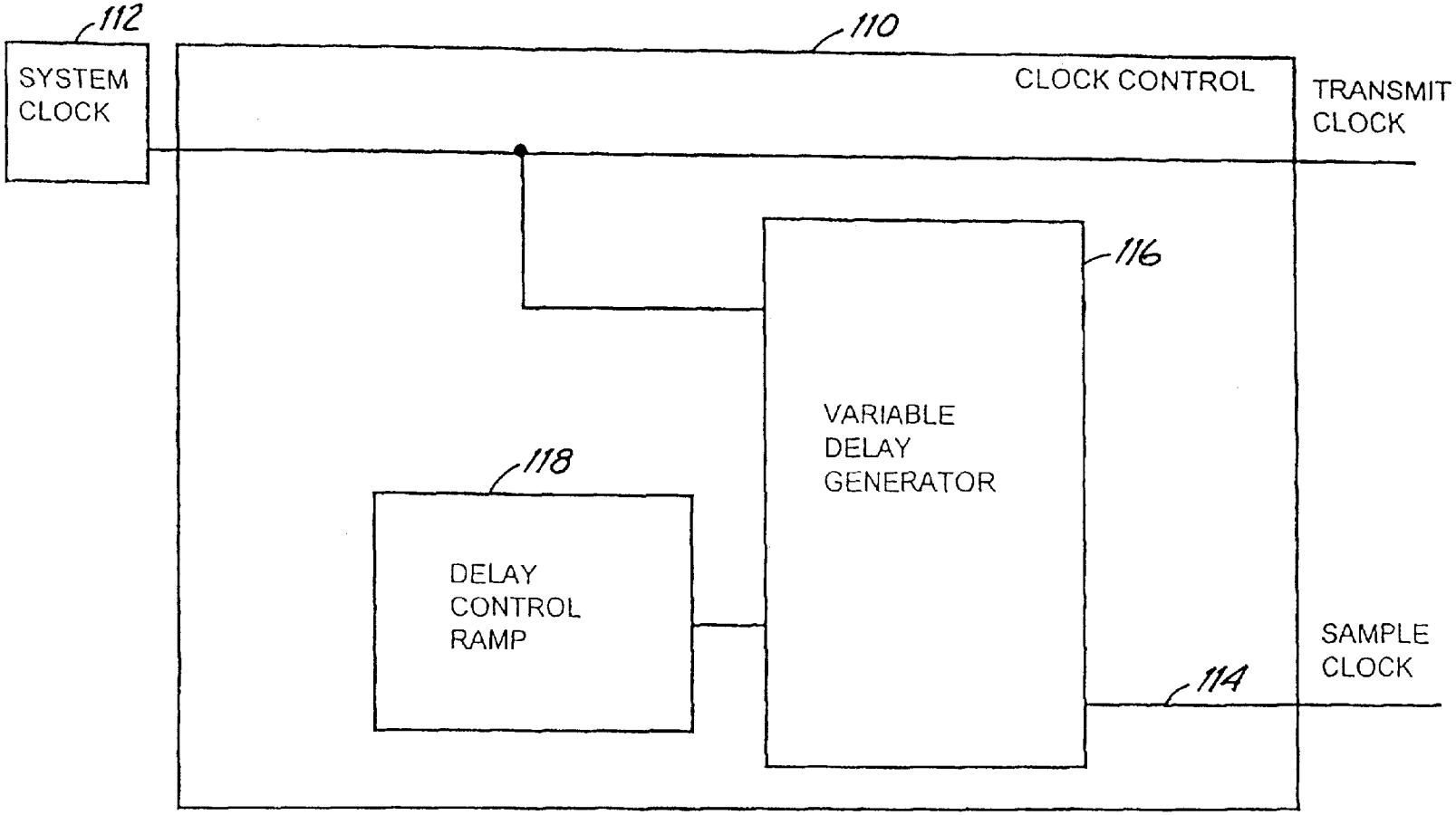
PRIOR ART Fig. 2
FIG. 2 shows PRIOR ART radar level gauge.
Figure 7:
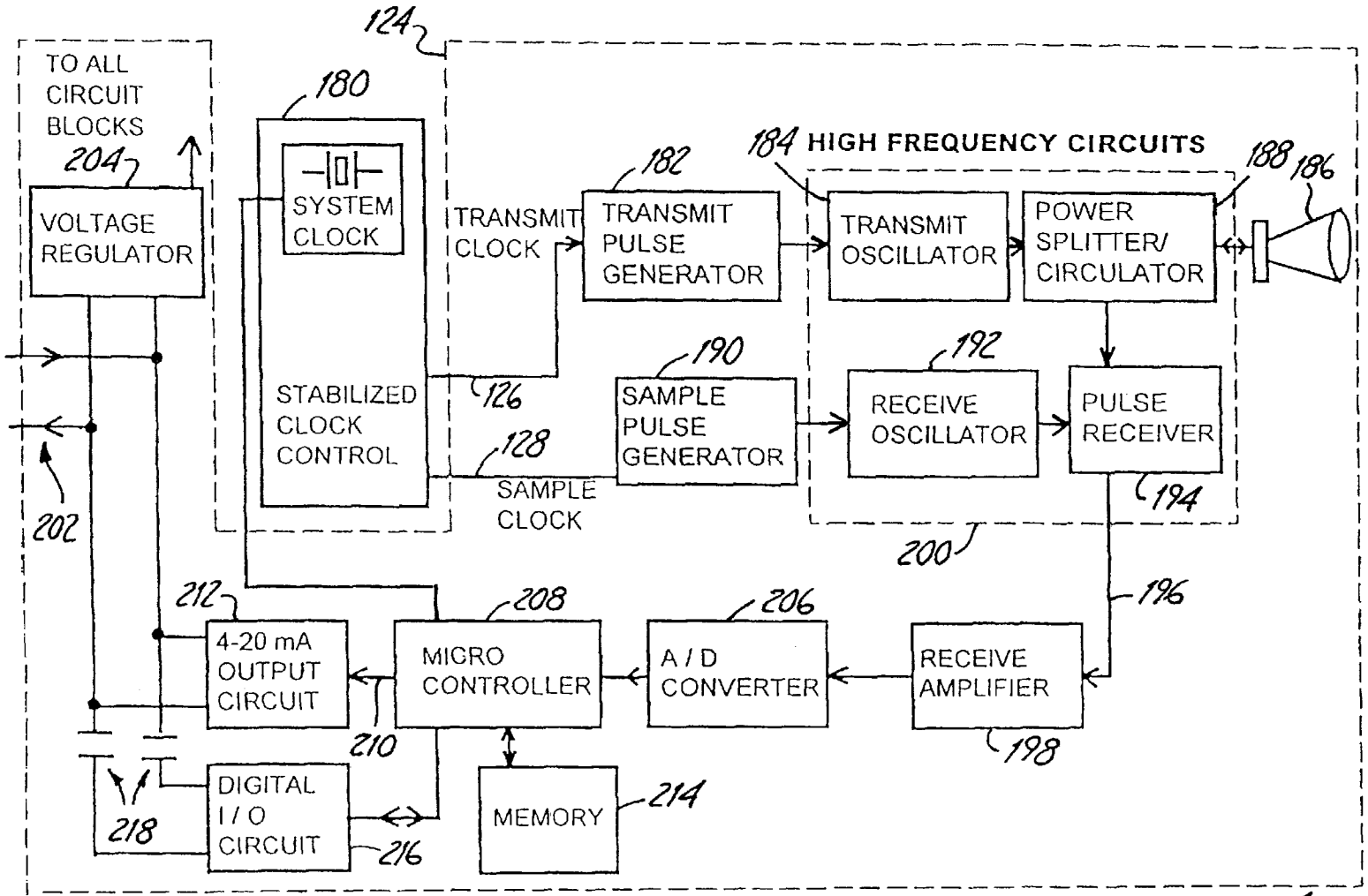
FIG. 7 shows a fourth block diagram of a radar level gauge.

In FIG. 1, a clock control circuit 100 is shown that can be used in a radar gauge circuit (described later in connection with FIG. 7) to sense fluid level in a tank. The radar gauge circuit of FIG. 7 is adapted to receive a transmit frequency on line 126 and a sample frequency on line 128 controlling radar transmission and level sampling respectively. The radar gauge circuit generates a level output at 202 in FIG. 7.

In FIG. 1, a clock source comprises a system clock 106 and a VCO 104. The clock source generates a first clock frequency on line 107 and a second clock frequency on line 105. The difference between the first clock frequency and the second clock frequency is called a first frequency separation. The clock source has a control input at 109 setting a first frequency separation between the first and second clock frequencies, by controlling the VCO frequency. A separation sensing circuit, or difference frequency detector 111 is coupled to the clock source and generates an evaluation output 113 as a function of the first frequency separation. A controller 102, which can be a microprocessor system, receives the evaluation output 113. The controller has a timer 115 that measures the first frequency separation. The controller generates a control output 116 that feeds back to the control input 109 via D/A converter 108. The feedback stabilizes the first separation as a function of timing the evaluation output 113 with timer 115. The controller 102 further has a correction circuit 117, preferably implemented in software, that corrects the level output as a function of the first frequency separation.

The circuit 100 in FIG. 1 utilizes a microprocessor 102 in the feedback loop to control the frequency of the VCO 104 to be offset by a fixed difference from the frequency of the system clock 106. In this circuit, the difference frequency between the two oscillators 104, 106 is precisely controlled. Since both the system clock 106 and the VCO 104 are continuously drifting in time, it is difficult to keep them locked to a very precise offset frequency. Also, the measurement of distance begins when the system clock 106 and sample clock 104 are in phase. Therefore, circuitry is used to detect when these two oscillators 104, 106 are in phase. The voltage of the D/A 108 is fixed during each measurement. This means that the oscillators will typically be drifting only slightly away from the exact difference frequency during the distance measurement. This results in improved stability in the distance measurement.

Figure 3:
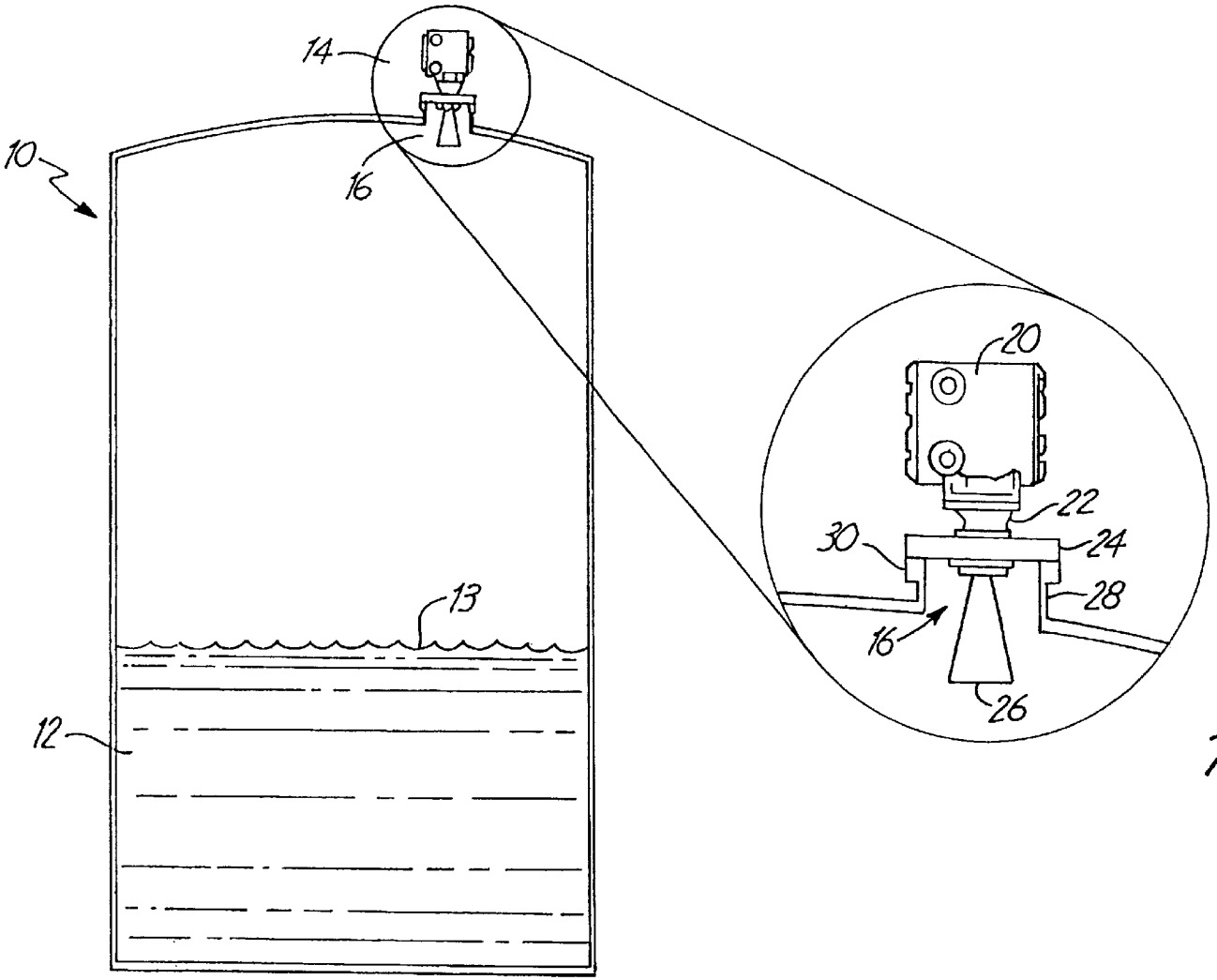
FIG. 3 shows a typical installation environment for a radar level gauge.

FIG. 3 shows a schematic representation of a process tank 10 in which a microwave radar level gauge is installed according to the present invention. Process tank 10 is filled with a liquid 12, the height or level of which is to be determined by radar level gauge 14. The radar level gauge 14 is mounted on a tank port 16 at the top of the tank, and is sealed relative to the tank. The radar level gauge 14 transmits microwave energy along a waveguide, through port 16 and receives reflected energy from the liquid surface 13 to provide an indication of the level of the liquid within the tank.

Radar level gauge 14 includes an electronics housing 20, a housing to flange adapter 22, a process connecting flange 24 and an antenna 26. Radar level gauge 14 is mounted to a standoff pipe 28 which is fastened to the top of tank 10, around port 16. Tank flange 30 is fastened to standoff pipe 28. Process connecting flange 24 is secured with bolts to tank flange 30 and is sealed with a suitable gasket. Process connecting flange 24 supports both adapter 22 and electronics housing 20.

Figure 4:
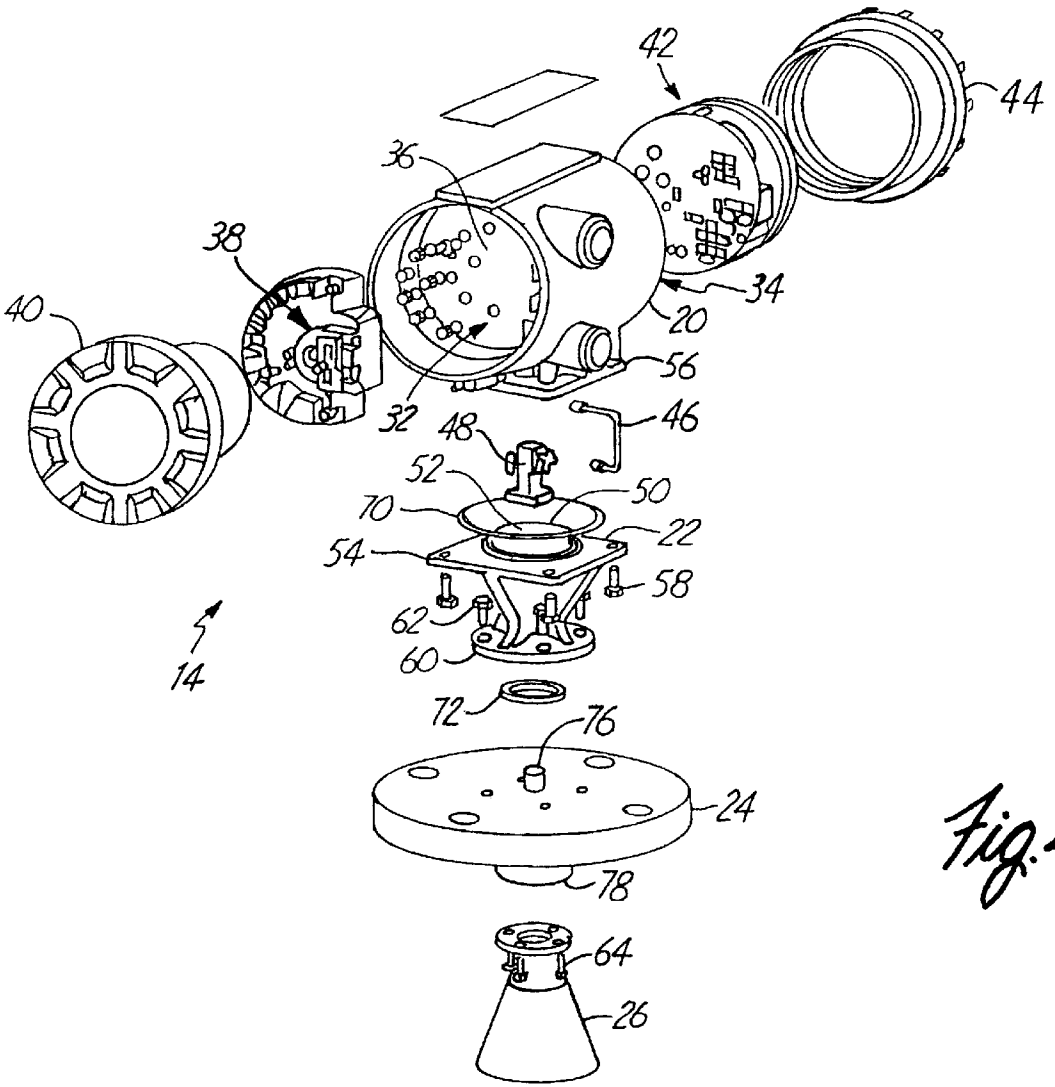
FIG. 4 shows an exploded view of a radar level gauge.

FIG. 4 is an exploded perspective view of radar level gauge 14. Electronics housing 20 includes a terminal compartment 32 and an electronics compartment 34 which are separated by a barrier 36. A terminal block 38 is mounted within terminal compartment 32 for providing external electrical connections to the electronics within electronics compartment 34. The external electrical connections are used to couple radar level gauge 14 to a process control link, such as a two or four wire process control loop or a process control bus, over which radar level gauge 14 receives power and signal information and transmits level measurements and other status information. A cover 40 is threaded into terminal compartment 32 for sealing the terminal compartment with respect to the outside environment. The electronics that are used for transmitting microwave energy, receiving the reflections and for making sensor calculations are provided on a stack of printed circuit boards 42 which are mounted within electronics compartment 34. The electronics are well known in the industry. A cover 44 is threaded into electronics compartment 34 for sealing the electronics compartment with respect to the outside environment.

The electronics, comprised of the stack of printed circuit boards 42, provide microwave energy through a coaxial cable (coax) connection 46 which is coupled to a coaxial to rectangular waveguide adapter 48, positioned within electronics housing 20. The coax to rectangular waveguide adapter 48 is secured with screws to a raised boss 50 of housing to flange adapter 22. A waveguide aperture 52 extends through adapter 22 for transmitting the microwave energy to and from antenna 26. Adapter 22 includes a mounting plate 54, which is secured to a lower housing flange 56 of electronics housing 20 with bolts 58. Mounting plate 60 is secured to process mounting flange 24 with bolts 62. Antenna 26 is secured to a lower surface of process connecting flange 24 with bolts 64. Antenna 26 is of conventional design and includes a central aperture at an upper end that aligns with the waveguide aperture 52 in adapter 22 and an aperture 76 through flange 24. Other types of housing and assembly methods can be used for less demanding applications.

Figure 5:
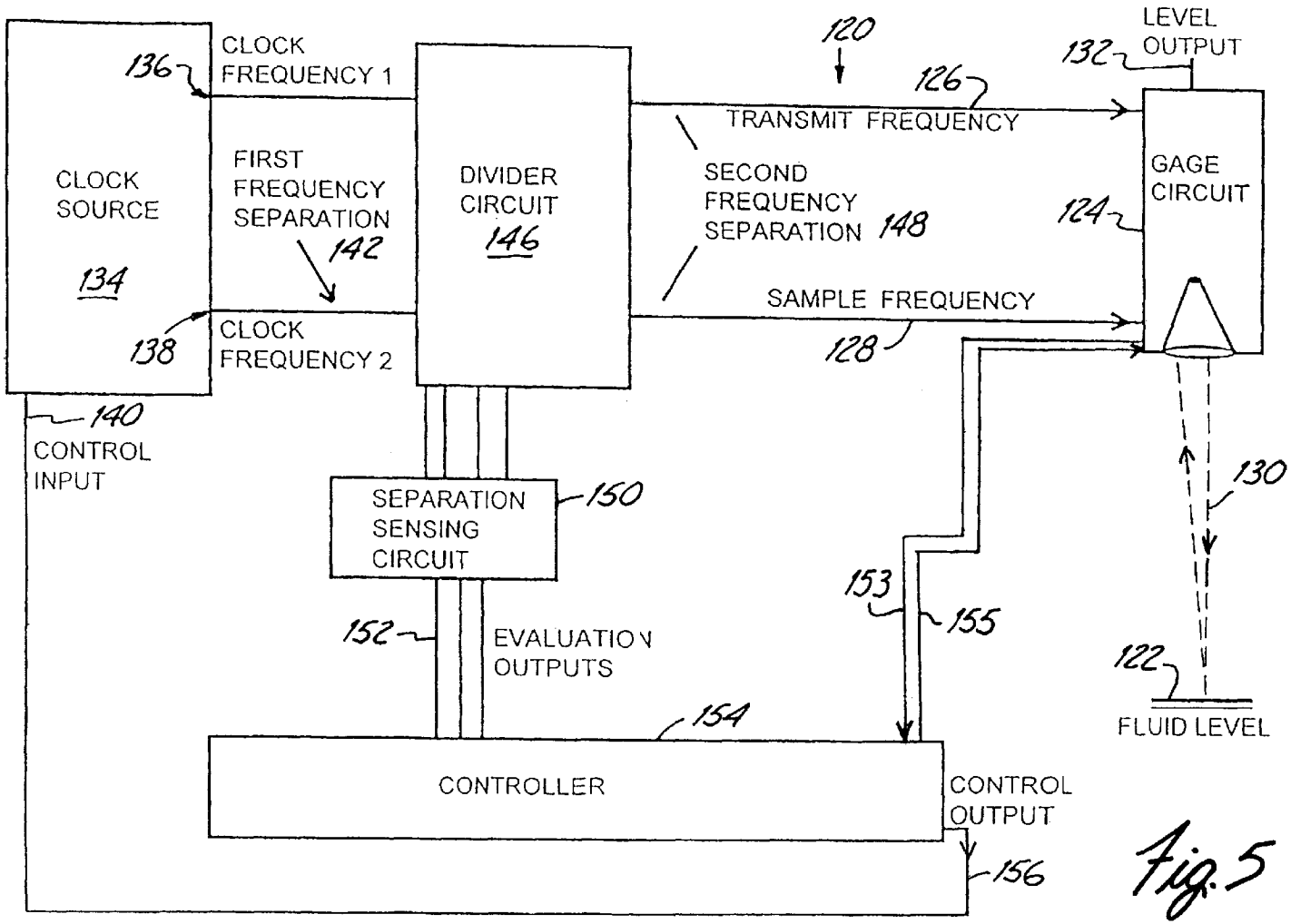
FIG. 5 shows a second block diagram of a radar level gauge with a divider circuit.

In FIG. 5, a block diagram of a radar gauge 120 is shown adapted to sense a fluid level 122 in a tank. Radar gauge 120 includes a radar gauge circuit 124 adapted to receive a transmit frequency 126 and a sample frequency 128 controlling radar transmission 130 and level sampling of fluid level 122 respectively. The radar gauge circuit 124 generates a level output 132 that is corrected by controller 154 for variations in frequency separation. A clock source 134 generates first clock frequency 136 and second clock frequency 138 and has a control input 140 setting a first frequency separation 142 between the first and second clock frequencies. A divider circuit 146 divides the first and second clock frequencies 136, 138 and generates the transmit and the sample frequencies 126, 128. The transmit and sample frequencies 126, 128 are separated from each other by a second frequency separation 148. A separation sensing circuit 150 couples to the divider circuit 146 and generates evaluation outputs 152 as functions of the first and second frequency separations 142, 148. A controller 154 receives the evaluation outputs 152. The controller 154 has a control output 156 feeding back to the control input 140 that stabilizes the first frequency separation 142 as a function of the evaluation outputs 152. The controller also receives an uncorrected level output on line 153, makes a correction for frequency separation, and provides a corrected level signal on line 155.

Figure 6:
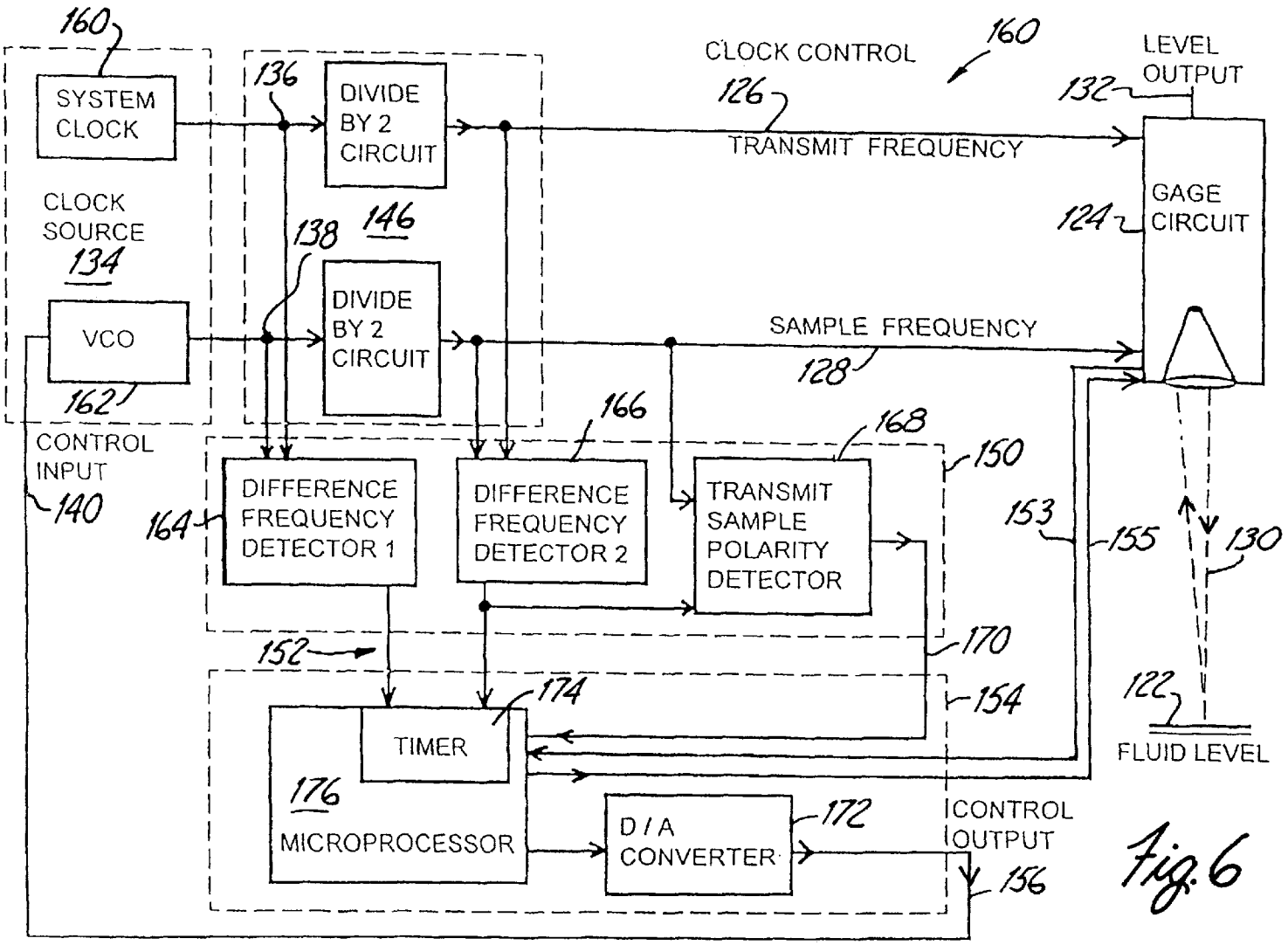
FIG. 6 shows a third block diagram of a radar level gauge with dividers.
Figure 8:
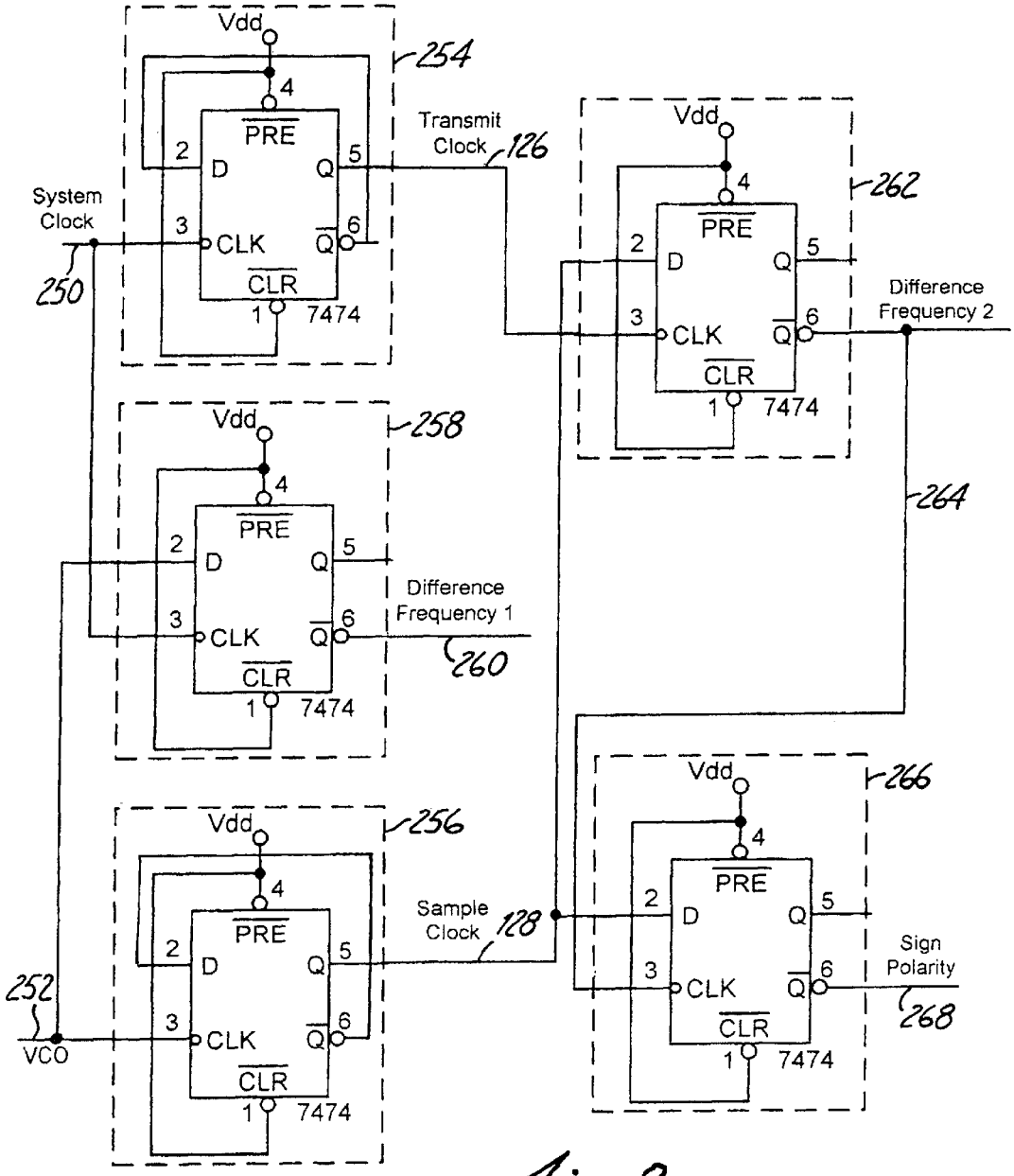
FIG. 8 shows a circuit diagram of an evaluation circuit for a radar level gauge.

In FIG. 6, a block diagram of a further embodiment 160 of a radar gauge is shown. In FIGS. 6-8, reference numerals are used that are the same reference numerals used in FIG. 5 and identify similar or corresponding features to those in FIG. 5. Clock source 134 includes a system clock 160, typically a crystal controlled oscillator that can also be used to provide other clock functions to gage circuit 124. Clock source 134 also includes a voltage controlled oscillator (VCO) 162 that receives a frequency control voltage at control input 140 and generates the second clock frequency 138. Separation sensing circuit 150 includes a first frequency difference detector circuit 164 sensing a first frequency difference between the frequencies 136, 138. Separation sensing circuit 150 also includes a second frequency difference detector circuit 166 sensing a second frequency difference between the frequencies 126, 128. Separation sensing circuit 150 further includes a transmit sample polarity detector circuit 168 sensing a polarity of the sample clock 128 and generating a further evaluation output 170 representative of the polarity.

In FIG. 6, controller 154 includes a digital-to-analog converter 172 generating the control output 156. Controller 154 includes a timer 174. Timer 174 can measure time intervals of the evaluation outputs 152. The timer 174 also counts the current value of the frequency difference and provides that current value to gauge circuit 124, such that the level output 132 is calculated based on a current value of the frequency difference. This current value takes into account any drifting of the first and second frequencies 136, 138 during the time that the current measurement is being made. Gauge circuit 124 calculates the level output based on this current value so that the output is stabilized as a function of the current timer measurement. Timer 174 can be implemented in hardware, in software running on microprocessor 176, or a combination of hardware and software. Timer 174 can perform a timer measurement of a count of an evaluation output during a selected time interval. Alternatively, a number of counts can be selected, and the time interval for that selected number of counts can be measured.

In FIG. 7, details of the construction of a radar gauge circuit 124 are shown in more detail. Gauge circuit 124 receives transmit and sample clocks 126, 128 as shown from a stabilized clock control 180. Stabilized clock control 180 includes circuitry such as that shown in FIG. 5 at 134, 146, 150, 154. Transmit pulse generator 182 receives transmit clock 126 and controls transmit oscillator 184 which is a pulsed high frequency microwave circuit. Transmit oscillator 184 generates a microwave output pulse that is provided to antenna 186 through power splitter 188. Sample pulse generator 190 receives sample clock 128 and controls receive oscillator 192. Receive oscillator 192 provides a reference waveform to pulse receiver 194. Pulse receiver 194 receives a return echo from antenna 186 through power splitter 188. Pulse receiver 194 combines or mixes the reference waveform from receive oscillator 192 and the return echo and generates a lower frequency output on line 196 that is low enough for processing by low cost, low frequency electronic receive amplifier 198. The arrangement using lower frequency circuits such as those shown at 182, 190, 194 to shift microwave measurements to a lower frequency is called equivalent time sampling and is known, for example, from "Smart Transmitter using microwave pulses to measure the level of liquids and solids in process applications" by Hugo Lang and Wolfgang Lubke, Instrument Society of America paper ISA #93-319 (1993).

The radar gauge circuit 124 includes a transmit pulse generator 182 and a sample pulse generator 190 controlled respectively by the transmit clock 126 and the sample clock 128. The output of the receive amplifier 198 is coupled to A/D converter 206 which converts the amplified signal to a digital form for use by microcontroller 208. Microcontroller 208 calculates the level and provides a level output on line 210 to a 4-20 mA output circuit 212. Output circuit 212 controls the 4-20 mA current energizing the radar level gauge to have an analog value representing the level. Microcontroller 208 utilizes memory 214 and also coupled to a digital I/O circuit 216 which provides two way digital communication over the 4-20 mA loop. The digital communication can be in the HART or Fieldbus format, or other known digital formats. Blocking capacitors 218 are interposed between digital I/O circuit 216 and the 4-20 mA loop to block the analog current from flowing through the digital I/O circuit. The radar gauge of FIG. 7 is energized solely by a 4-20 mA analog current 202 and includes a voltage regulator 204 energized by the 4-20 mA analog current.

In the circuits of FIGS. 5-7, frequency stabilization is used in sensing fluid level in a tank. First and second clock frequencies are generated, separated from each other by a first frequency separation controlled by a control input. First and second clock frequencies are divided to generate the transmit and sample frequencies separated from each other by a second frequency separation. Evaluation outputs are generated as functions of the first and second frequency separations. A control output is generated and fed back to the control input that stabilizes the first frequency separation as a function of the evaluation outputs. A level output is generated as a function of the stabilized first frequency separation.

A program to perform these processes can be loaded into controller 154 from a computer-readable medium having stored thereon a plurality of sequences of instructions for execution by a processor in a radar gauge adapted to sense fluid level in a tank.

In FIG. 8, a circuit diagram of a divider circuit and a separation sensing circuit such as circuit 150 is shown. A system clock frequency is received at 250, and a VCO frequency is received at 252. A first divide by two circuit 254 divides the system clock frequency and generates a transmit clock frequency 126. A second divide by two circuit 256 receives the VCO frequency and generates a sample clock frequency 128. A first frequency difference circuit 258 receives both the system clock frequency and the VCO frequency and generates a first frequency difference output at 260. A second frequency difference circuit 262 receives the transmit clock frequency and the sample clock frequency and generates a second frequency difference output at 264. A polarity sensing circuit 266 senses the polarity of the sample clock relative to the second frequency difference output and generates a polarity, or sign, output at 268. Each of the functions in FIG. 8 can be performed using a low cost type 7474 clocked D flip flop wired as shown in FIG. 8.

The sample polarity detector is connected as a latch that stores the polarity of the sample clock after the leading edge of the transmit clock toggles the Q/ output of the second difference frequency detector. The output of the transmit sample polarity detector is coupled to the microprocessor to indicates whether the sample clock has a lower or higher frequency that the transmit clock. The polarity detector resolves any ambiguity in the absolute value of the frequency difference.

The radar level gauge with stabilization has the advantage of low cost and low phase jitter, while improving overall performance.

The stabilization allows a low cost pulsed microwave radar measurement to be made with improved performance. The method involves measuring and correcting for the difference between the two critical clock frequencies required in this system, as opposed to trying to precisely generate or control these frequencies.

A timer in the microprocessor counts or times the outputs of the first and second difference frequency detectors. Based on these counts or times, the microprocessor calculates real time data representing the absolute value of the frequency difference between the transmit frequency and the sample frequency. The microprocessor then executes algorithm that adjusts the control voltage provided to the VCO to maintain the difference frequency in a desired range. The control algorithm in the microprocessor is adjusted so that it does not tightly control the frequency difference, but maintains only limited control within the desired range. The use of limited control rather than tight control of the frequency difference allows low power, low resolution components to be used in the frequency control. Oscillator drift is too fast for the low power, low resolution circuitry to control it, making frequency difference counts somewhat different during each measurement.

The timer is also used to precisely count the somewhat varying difference frequency during the exact time that the distance is being measured. The microprocessor then adjusts the distance calculation based on the actual count of the difference frequency. The timer can be a hardware timer, software implemented in a microprocessor, or a combination of both. In the microprocessor's algorithm or equation for calculating distance, the frequency difference term $\Delta F$ is a real time variable measured by the timer rather than a constant term or a term adjusted only infrequently for compensation.

The combination of limited control of the frequency difference with a precise count of the frequency difference enables the radar gauge to operate with lower noise due to phase jitter in combination with higher accuracy due to precise correction of distance measurement for variations in frequency during the measuring interval and the overall performance of the radar gauge is improved. High phase jitter on the sample clock leads to an unstable equivalent time measurement and instability at level output 132.

Although the present invention has been described with reference to preferred embodiments, workers skilled in the art will recognize that changes may be made in form and detail without departing from the scope of the invention.

What is claimed is:

1. A radar gauge adapted to sense fluid level in a tank, comprising:

a radar gauge circuit adapted to receive a transmit frequency and a sample frequency controlling radar transmission and level sampling respectively, the radar gauge circuit generating a level output;

a clock source generating first and second clock frequencies and having a control input setting a first frequency separation between the first and second clock frequencies;

a separation sensing circuit coupled to the clock source and generating an evaluation output as a function of the first frequency separation;

a controller receiving the evaluation output, the controller having a timer that measures the frequency separation and a control output feeding back to the control input that stabilizes the first separation as a function of timing the evaluation outputs, the controller further having a correction circuit that corrects the level output as a function of the first frequency separation;

a divider circuit dividing the first and second clock frequencies and generating the transmit and the sample frequencies wherein the transmit and sample frequencies are separated from each other by a second frequency separation; and the separation sensing circuit further coupling to the divider circuit and generating a second evaluation output coupling to the controller as a function of the second frequency separation.

2. The radar gauge of claim 1 wherein the separation sensing circuit further comprises:

a circuit sensing a polarity of the sample clock and generating a further evaluation output representative of the polarity.

3. The radar gauge of claim 1 wherein the clock source comprises a voltage controlled oscillator controlled by the control output and generating the second clock frequency.

4. The radar gauge of claim 3 wherein the controller comprises a digital-to-analog converter generating the control output.

5. The radar gauge of claim 1 wherein the controller includes a timer measuring time intervals of an evaluation output.

6. The radar gauge of claim 5 wherein the level output includes a current calculated distance that is a function of a current timer measurement.

7. The radar gauge of claim 1 wherein the controller includes a timer performing a timer measurement of a count an evaluation output during a time interval.

8. The radar gauge of claim 7 wherein the level output includes a current calculated distance that is a function of a current timer measurement.

9. The radar gauge of claim 1 wherein the radar gauge circuit includes a transmit pulse generator and a sample pulse generator controlled respectively by the transmit clock and the sample clock.

10. The radar gauge of claim 1 wherein the radar gauge is energized solely by a 4-20 mA analog current and includes a voltage regulator energized by the 4-20 mA analog current.

11. A method of stabilizing clock generation in a radar gauge adapted to sense fluid level in a tank, comprising:

generating first and second clock frequencies separated from each other by a first frequency separation controlled by a control input;

generating a first evaluation output as a function of the first frequency separation;

generating a control output feeding back to the control input that stabilizes the first separation as a function of the evaluation output;

generating a level output as a function of the stabilized first frequency separation, the level output corrected as a function of the first frequency separation;

dividing the first and second clock frequencies to generate the transmit and sample frequencies separated from each other by a second frequency separation;

generating a second evaluation output as a function of the second frequency separation;

generating the control output as a further function of the second evaluation output; and correcting the level output as a function of the second evaluation output.

12. The method of claim 11, further comprising:

sensing a polarity of the sample clock and generating a further evaluation output representative of the polarity.

13. The method of claim 11 further comprising:

generating the second clock frequency in a voltage controlled oscillator wherein an oscillator control voltage is controlled by the control output.

14. The method of claim 13 further comprising:

generating the oscillator control voltage in a digital-to-analog converter.

15. A radar gauge adapted to sense fluid level in a tank, comprising:

means for receiving a transmit frequency and a sample frequency controlling radar transmission and level sampling respectively, and for generating a level output;

means for generating first and second clock frequencies separated from each other by a first frequency separation, the clock source having a control input setting the first separation;

means for dividing the first and second clock frequencies and for generating the transmit and sample clock frequencies separated from each other by a second frequency separation;

means for sensing the first and second frequency separations and generating evaluation outputs as functions of the first and second frequency separations; and means for controlling a control output feeding back to the control input, stabilizing the first separation as a function of the evaluation outputs.

16. The radar gauge of claim 15, further comprising:

means for sensing a polarity of the sample clock and generating a further evaluation output representative of the polarity.

*17. A radar gauge adapted to sense fluid level in a tank, the gauge comprising:*

*a radar gauge circuit adapted to receive a transmit frequency and a sample frequency controlling radar transmission and level sampling respectively, the radar gauge circuit generating a level output;*

*a clock source generating first and second clock frequencies and having a control input setting a first frequency separation between the first and second clock frequencies;*

*a separation sensing circuit coupled to the clock source and generating an evaluation output as a function of the first frequency separation;*

*a controller receiving the evaluation output, the controller having a timer that measures the frequency separation and a control output feeding back to the control input that stabilizes the first separation as a function of timing the evaluation outputs, and controller further having a correction circuit that corrects the level output as a function of the first frequency separation;*

*a circuit processing the first and second clock frequencies to generate third and fourth frequencies separated from each other by a second frequency separation; and*

*wherein the separation circuit generates a second evaluation output as a function of the second frequency separation.*

*18. The gauge of claim 17, and further comprising a circuit sensing a polarity of the sample clock and generating a further evaluation output representative of the polarity.*

*19. The gauge of claim 17, wherein the further evaluation output is provided to the controller, which controller then uses the further evaluation output to generate, in part, the control input.*

*20. The gauge of claim 17, wherein the circuit sensing the polarity is embodied on a D-flip flop.*

*21. The gauge of claim 20, wherein the D flip flop is a 7474 clocked D-flip flop.*

*22. The gauge of claim 17, wherein the clock source further includes a voltage controlled oscillator (VCO) coupled to the control input.*

*23. The gauge of claim 17, wherein the separation sensing circuit is embodied on a D-flip flop.*

*24. The gauge of claim 23, wherein the D-flip flop is clocked 7474 D-flip flop.*

*25. The gauge of claim 17, and further comprising a divider circuit dividing the first and second clock frequencies and generating the transmit and sample frequencies wherein the transmit and sample frequencies are separated by a second frequency separation and wherein the first frequency separation is higher than the second frequency separation.*

*26. A method of stabilizing clock generation in a radar gauge adapted to sense fluid level in a tank, comprising:*

*generating first and second clock frequencies separated from each other by a frequency separation controlled by a control input;*

*generating a first evaluation output as a function of the frequency separation;*

*generating a control output feeding back to the control input that stabilizes the separation as a function of the evaluation output;*

*generating a level output as a function of the stabilized frequency separation, the level output corrected as a function of the frequency separation;*

*generating an indication of the polarity of the sample clock;*

*generating the control output as a further function of the evaluation output and the polarity indication; and*

*correcting the level output as a function of the evaluation output.*

*27. A radar gauge adapted to sense fluid level in a tank, the gauge comprising:*

*a radar gauge circuit adapted to receive a transmit frequency and a sample frequency controlling radar transmission and level sampling respectively, the radar gauge circuit generating a level output;*

*an unstabilized clock generating a first clock frequency;*

*a controllable oscillator generating a second clock frequency, the oscillator having a control input setting a first frequency separation between the first and second clock frequencies, the transmit and sample frequencies being related to the first and second clock frequencies;*

*a separation sensing circuit coupled to unstabilized clock and the controllable oscillator, the sensing circuit generating a separation output as a function of the first frequency separation;*

*a controller coupled to the radar gauge circuit and providing the level output; and*

*wherein the separation output is operably coupled to the control input such that the first frequency separation is stabilized.*

*28. The gauge of claim 27, wherein the separation output is operably coupled to the control input through the controller.*

*29. The gauge of claim 28, and further comprising polarity sensing circuitry coupled to the sample clock and the controller, the polarity sensing circuitry being adapted to sense polarity of the sample clock, and provide a polarity output, and wherein the control input is based, at least in part, upon the first frequency separation and the polarity output.*

*30. The gauge of claim 29, wherein the controller is adapted to correct the level output as a function of the first frequency separation.*

* * * * *

UNITED STATES PATENT AND TRADEMARK OFFICE

CERTIFICATE OF CORRECTION

PATENT NO. : RE 40,128 E
APPLICATION NO. : 10/680875
DATED : March 4, 2008
INVENTOR(S) : Kielb It is certified that error appears in the above-identified patent and that said Letters Patent is hereby corrected as shown below:

Title Page; item (56);

References Cited: Please delete "4,044,353 A * 8/1977 Levy...342/124" and replace with --4,044,353 A * 8/1977 Levy...343/12--

Col. 8, ln. 43: Please delete "and" and replace with --the--

Signed and Sealed this

Twenty-eighth Day of October, 2008

JON W. DUDAS
*Director of the United States Patent and Trademark Office*